United States Patent [19]

Wallach

[11] Patent Number: 4,948,823
[45] Date of Patent: Aug. 14, 1990

[54] NUCLEATING SYSTEMS

[75] Inventor: Morton L. Wallach, Leominster, Mass.

[73] Assignee: Polysar Financial Services S.A., Fribourg, Switzerland

[21] Appl. No.: 278,342

[22] Filed: Dec. 1, 1988

[51] Int. Cl.$^5$ .......................... C08K 5/15; C08L 67/02
[52] U.S. Cl. ..................... 524/112; 524/494; 524/504; 524/505; 524/513; 524/605
[58] Field of Search ............... 524/107, 110, 112, 494, 524/504, 505, 513, 605

[56] References Cited

U.S. PATENT DOCUMENTS

| | | | |
|---|---|---|---|
| 4,239,677 | 12/1980 | Dieck | 524/605 |
| 4,264,487 | 4/1981 | Fromuth | 524/504 |
| 4,299,927 | 11/1981 | Dombroski | 525/64 |
| 4,351,758 | 9/1982 | Lu et al. | 524/227 |
| 4,558,096 | 12/1985 | Boon et al. | 525/166 |

FOREIGN PATENT DOCUMENTS

| | | | |
|---|---|---|---|
| 081144 | 6/1983 | European Pat. Off. | 524/605 |
| 017909 | 5/1972 | Japan . | |
| 062245 | 5/1975 | Japan . | |
| 067556 | 4/1985 | Japan | 524/112 |
| 095059 | 5/1986 | Japan . | |

Primary Examiner—John C. Bleutge
Assistant Examiner—David Buttner
Attorney, Agent, or Firm—Stevens, Davis, Miller & Mosher

[57] ABSTRACT

Solid anhydrides of carboxylic acids, which anhydrides have a melting temperature of at least 100° C. and a boiling temperature of at least 230° C. at STP are suitable for use in nucleating systems for polyester compositions. Such nucleating systems reduce (i) mold cycle time (ii) mold temperature and (iii) the sensitivity of the composition to water during molding.

14 Claims, No Drawings

NUCLEATING SYSTEMS

FIELD OF THE INVENTION

The present invention relates to polyester composites which may contain fibers and/or alloy modifiers. More particularly such composites contain a nucleating system which enhances crystal formation, growth, and improves the processability of the composite (e.g. reducing sensitivity to moisture during compounding and molding). Such nucleating systems comprise solid anhydrides of carboxylic acids, which anhydrides have a melting point of at least 100° C. and a boiling point of not less than 230° C. at standard temperature and pressure (STP).

BACKGROUND OF THE INVENTION

Generally polyesters are produced by the reaction of di or polyols with a dicarboxylic acid such as terephthalic acid. These high molecular weight esters have found application in a number of areas including fibers and bottles. Polyesters are sensitive to moisture on processing. Care must be taken to reduce moisture levels in the resins to acceptable limits generally in the order of 0.02 percent or less. This is a particularly acute problem in compounding and molding polyesters such as polyethylene terephthalate (PET). Generally, in processing thermoplastics it is desirable to incorporate small amounts of nucleating agents in the composition to increase the rate of nucleation and crystalization, which reduces the time the thermoplastic is in the mold and the mold temperature required. The present invention seeks to meet these requirements by providing nucleating systems comprising organic anhydrides which may be used per se or in combination with other effective nucleating agents.

U.S. Pat. No. 4,558,096 issued Dec. 10, 1985 assigned to the Goodyear Tire and Rubber Company discloses a composition comprising 10 to 90 percent of polyethylene terephthalate from 10 to 90 percent of an ethylene propylene diene monomer (EPDM) rubber or an ethylene propylene rubber (EPR) and as a compatibilizer from 0.001 to about 2.0 weight percent of a $C_{8-30}$ alkyl derivative of succinic anhydride and dimers and polymers of a specified formula containing a succinic anhydride residue in its backhome. The patent does not disclose or suggest that anhydrides per se are useful in a nucleating system.

U.S. Pat. No. 4,299,927 issued Nov. 10, 1981 to Eastman Kodak Company discloses a blend comprising 50 to 90 weight percent of a polyester, 50 to 10 weight percent of an anhydride modified polyolefin and 0.1 to 10 weight percent of a $C_{4-22}$ alkyl derivative of succinic anhydride. The patent does not teach or suggest that anhydrides are useful in nucleating systems.

U.S. Pat. No. 4,351,758 issued Sept. 28, 1982 to Lu. et al discloses a high molecular weight terephthalate ester composition which has a moisture content of between 0.05 and 0.68 weight percent. The nucleating agents are alkali metal salts having anions which are oxides of elements of Group IV of the periodic table; talc and barium sulfate. The patent does not suggest that organic anhydrides could be used per se or in conjunction with other nucleating agents as a nucleating system.

There have been extensive studies of the heterogeneous nucleation of polyolefins and particularly polypropylene. These studies have generally concluded that the optimum nucleating agents for polypropylene are alkali metal salts of organic acids such as sodium benzoate or aluminum dibenzoate. Additionally it has been concluded that there should be a structural compatibility between the nucleating agents and the polymer. (Beck, H. N. (1967) Heterogeneous Nucleating Agents for Polypropylene Crystalization, J. Appl. Polym Sci 11, 673; Beck H. N. and Ledbetter H. D. (1965) DTA Study of Heterogeneous Nucleation of Crystallization in Polypropylene, J. Appl. Polym. Sci. 9,2131; Binsbergen F. L. (1970) Heterogeneous Nucleation in the Crystalization of Polyolefins: Part I Chemical and Physical Nature of Nucleating Agents, Polymer 11, 253; and Binsbergen F. L. (1973) Heterogeneous Nucleation in the Crystalization of Polyolefins III. Theory and Mechanism, J. Polym. Sci. Polym. Phys. Ed. 11, 117).

This art teaches away from using nucleating systems based on anhydrides. Generally, one skilled in the art would not have considered organic anhydrides as a basis for nucleating systems.

The present invention seeks to provide improved nucleating systems and polyester compositions which incorporate such nucleating systems.

SUMMARY OF THE INVENTION

The present invention provides a composition comprising:
  (A) at least 0.2 weight percent of a nucleating system comprising at least 50 weight percent of at least one solid anhydride of an organic carboxylic acid, said anhydride having a melting temperature of at least 100° C. and a boiling temperature of not less than 230° C. and up to 50 weight percent of one or more nucleating agents selected from the group consisting of:
    (i) talc and sodium bicarbonate;
    (ii) alkali metal salts of carboxylic acids;
    (iii) ionomers; and;
    (iv) crystalization promoters;
  (B) from 35 to 99 weight percent of a mixture comprising:
    (i) at least 50 weight percent of one or more high molecular weight crystalizable polyesters; and
    (ii) up to 50 weight percent of one or more alloy modifiers;
  (C) optionally up to 60 weight percent of one or more fillers selected from the group consisting of:
    (i) fibers having a length up to ¾ inch selected from the group consisting of glass, other inorganic fibers, carbon fiber and aramid fibers, provided that if glass fiber is present up to 50 weight percent of the glass fiber may be replaced by a low warpage mineral additive; and
    (ii) particulate inorganic fillers.
  (D) optionally up to 35 weight percent of one or more rubbery impact modifiers;
  (E) from 0.5 to 5 weight percent of one or more process aids;
  (F) optionally up to a total of about 20 weight percent of one or more additives selected from the group consisting of antioxidants, flame retardants, heat and light stabilizers, coupling agents and mold release agents; and
  (G) pigment as required.

The present invention also provides a nucleating system comprising 50 to 100 weight percent of at least one solid $C_{4-14}$ anhydride of a carboxylic acid, said anhydride having a melting temperature of at least 100° C. and a boiling temperature of not less than 230° C. and up to 50 weight percent of one or more nucleating agents selected from the group consisting of:
(i) talc and sodium bicarbonate;
(ii) alkali metal salts of carboxylic acids;
(iii) ionomers; and
(iv) crystalization promoters.

The present invention further provides a process for preparing a polyester or polyester blend having an improved crystalization rate comprising feeding via separate feeds to a multifeed extruder operating at from 100 to 450 RPM and a temperature from 250° to 350° C.
(A) from 35 to 99 weight percent of a thorough mixture of a polymer composition comprising
(i) at least 50 weight percent of one or more high molecular weight crystalizable polyesters; and
(ii) up to 50 weight percent of one or more alloy modifiers;
said composition having been dried at a temperature from 240° to 275° F. for a period of time from 4 to 6 hours;
(B) optionally up to 60 weight percent of one or more fillers selected from the group consisting of:
(i) fibers having a length up to ¾ inch selected from the group consisting of glass, other inorganic fibers, carbon fiber and aramid fibers, provided that if glass fiber is present up to 50 weight percent of the glass fiber may be replaced by a low warpage mineral additive; and
(C) a thorough mixture comprising:
(i) at least 0.2 weight percent of a nucleating system comprising at least 50 weight percent of at least one solid anhydride of an organic carboxylic acid, said anhydride having a melting temperature of at least 100° C. and a boiling temperature of not less than 230° C. and up to 50 weight percent of one or more nucleating agents selected from the group consisting of:
talc and sodium bicarbonate; alkali metal salts of carboxylic acids; ionomers; and; crystalization promoters;
(ii) optionally up to 35 weight percent of one or more rubbery impact modifiers;
(iii) from 0.5 to 5 weight percent of one or more process aids;
(iv) optionally up to a total of about 20 weight percent of one or more additives selected from the group consisting of antioxidants, flame retardants, heat and light stabilizers, coupling agents and mold release agents; and
(v) pigment as required.

DETAILED DESCRIPTION OF THE INVENTION

Without being bound by theory it is believed that the nucleating systems of the present invention synergistically act in two ways. First they act as a site for crystal formation and growth. Second they act as moisture scavangers, an aspect of polyester, such as PET, processing which is particularly important. The nucleating systems of the present invention is used in an amount of at least 0.2 weight percent of the composite. Preferably the nucleating system is used in an amount from 0.5 to 10 weight percent of the composite.

The solid anhydrides of organic carboxylic acids useful in accordance with the present invention are anhydrides having a melting temperature of at least 40° C., preferably at least 100° C. and a boiling temperature of at least 230° preferably greater than 250° C. as measured at standard temperature and pressure (STP). Suitable organic anhydrides contain from 4 to 14 carbon atoms. Preferred anhydrides include succinic anhydride, phthalic anhydride and a mixture thereof. It should be noted that the anhydrides of the present invention may also be mixed anhydrides. The anhydride is used in an amount of at least 50 weight percent of the nucleating system.

The nucleating system of the present invention may further comprise from 0 up to 50 weight percent of one or more nucleating agents selected from the group consisting of:
(i) talc and sodium bicarbonate;
(ii) alkali metal salts of carboxylic acids;
(iii) ionomers; and
(iv) crystalization promoters.

Suitable carboxylic acids include $C_{1-18}$ carboxylic acids such as sodium benzoate and sodium stearate. Suitable ionomers include partially neutralized copolymers of ethylene and methacrylic acid. Preferably these copolymers are neutralizaed with sodium and/or zinc cations. A particularly useful ionomer is sold under the trademark SURLYN. Tallow fatty acid sulfonamide and triphenyl phosphite are useful crystalization promoters.

The compositions of the present invention further comprise from 35 to 99 preferably from 60 to 80 weight percent of a mixture comprising at least 50 weight percent of one or more high molecular weight crystalizable polyesters such as poly $C_{2-4}$ alkylene terephthalates, preferably poly (ethylene terephthalate), poly (butylene terephthalate) or a mixture thereof and optionally up to 50 weight percent of one or more alloy modifiers. If present, the alloy modifier is preferably used in amounts from 5 to 40 weight percent of the polymer mixture. Alloy modifiers include for example polycarbonates. Polycarbonate resin may be derived from bis-(hydroxyphenyl) alkanes such as 2,2'-bis-(4-hydroxy-phenyl) propane; 2,2'-bis-(4 hydroxy-3 methyl-phenyl) propane; 2,2'-bis-(4 hydroxy-3,5-dimethyl-phenyl) propane and their higher and lower alkyl homologues such as the ethane, and pentane homologues. The bis-(hydroxyphenyl) alkane is reacted with phosgene, a haloformate or a carbonate ester to produce the polycarbonate. A particularly preferred carbonate is based on bisphenol-A,(2,2'-bis-(4-hydroxy-phenyl) propane).

Optionally the compositions of the present invention may contain up to 60, preferably from 20 to 45 weight percent of a filler. The filler may be one or more fillers selected from the group consisting of:
(i) fibers having a length up to ¾ of an inch (about 2 cm) selected from the group consisting of glass, other inorganic fibers, carbon fibers, and aramid fibers; and
(ii) particulate inorganic fillers.

The fiber may be up to about ¾ an inch in length, but preferably has a length of about ⅛ of an inch (about 0.3 cm). Suitable fibers include glass, other inorganic fibers, carbon fibers and aramide fibers such as KEVLAR (trademark). Suitable other inorganic fibers include aluminum, boron, and steel fibers but more exotic fibers such as those of tantalum, titanium and tungsten may be used. Inorganic fibers also include ceramic fibers such as silicon carbide fibers.

If glass fibers are used up to 50 weight percent of the glass fiber may be replaced with a low warpage mineral additive such as mica, talc or clay. Mica is a preferred low warpage additive.

Particulate inorganic fillers include calcium carbonate (calcite), metals and metalic oxides such as MgO, $TiO_2$, BeO, ZnO, $ZrO_2$, $Fe_2O_3$, and aluminum and zinc powder, $Al_2O_3$, mica, kaolin, and talc.

The compositions in accordance with the present invention may be high impact compositions. That is they may contain up to about 35 preferably from 10 to 30 weight percent of a rubbery impact modifier. Typically, after processing the rubbery impact modifier is in the form of small (e.g. less than 5 u-preferably less than 1.5 u) discontinuous particles distributed throughout the continuous polyester matrix. Suitable impact modifiers include ethylene-propylene rubbers (EP); ethylene-propylene-diene monomer rubbers (EPDM); styrene-butadiene-styrene block polymers (S-B-S block polymers); hydrogenated styrene-butadiene-styrene block copolymers; acrylate rubbers; core/shell acrylates such as Paraloids (T.M.); and co or homopolymers of $C_{4-6}$ conjugated diolefins which are unsubstituted or substituted by a chlorine atom such as polybutadiene.

Such impact modifiers optionally further comprise up to about 15 weight percent of one or more functional monomers selected from the group consisting of:

(i) $C_{3-8}$ ethylenically unsaturated carboxylic acids;

(ii) anhydrides of $C_{3-8}$ ethylenically unsaturated carboxylic acids;

(iii) $C_{1-8}$ alkyl and hydroxyalkyl esters of $C_{3-8}$ ethylenically unsaturated carboxylic acids;

(iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxalkyl radicals;

(v) $C_{3-8}$ alkenyl and hydroxyalkenyl esters of $C_{1-8}$ saturated carboxylic acids; and (vi) $C_{3-8}$ ethylenically unsaturated aldehydes.

Some $C_{3-8}$ ethylenically unsaturated carboxylic acids are acrylic acid, methacrylic acid, itaconic acid and fumaric acid. A suitable anhydride is maleic anhydride. Some $C_{1-8}$ alkyl and hydroxyalkyl esters of $C_{3-8}$ ethylenically unsaturated carboxylic acids are methyl, ethyl, propyl, butyl, hexyl, hydroxyethyl, and ethylhexyl acrylates and their higher acid homologues such as the methacrylate esters. Some amides of $C_{3-8}$ ethylenically unsaturated carboxylic acids are acrylamide, methacrylamide, N-methylol acrylamide and N-methyl methacrylamide. A suitable $C_{3-8}$ alkenyl or hydroxyalkenyl ester of a $C_{1-8}$ saturated carboxylic acid is vinyl acetate. Acrolein is a $C_{3-8}$ ethylenically unsaturated aldehyde.

Preferably, EP, EPDM, functionalizaed EP, and functionalized EPDM are used as impact modifiers only when an alloy modifier is present.

The compositions of the present invention may contain process aids in an amount from 0.5 to 5 weight percent. Preferably the process aid is used in an amount from 1 to 3, most preferably about 2 weight percent. A particularly useful process aid is high density polyethylene.

The compositions of the present invention may also contain up to a total of about 25 weight percent of one or more of antioxidants, flame retardants, heat and light stabilizers, coupling agents and mold release agents. Such materials are well know to those skilled in the art and are listed in various handbooks and texts such as Plastics Technology published annually by Bill Communications Inc., 633 Third Avenue, New York, N.Y., and Modern Plastics Encyclopedia published annually by McGraw-Hill Inc., 1221 Avenue of the Americas, New York, N.Y.

If required the compositions of the present invention may contain pigment.

Preferably the compositions of the present invention are prepared as pellets prior to use in injection molding. Typically the polyester, may be either virgin or a mixture of virgin and recycle in a weight ratio from about 1:1 to 1:4 respectively. If a mixture of polyester and alloy modifier are used they are throughly mixed using a suitable mixer such as a ribbon mixer. The mixed polymeric components are dried at from 240°–270° F. for from 4–6 hours and fed in pellet, flake or powder form to the hopper of an extruder. Preferably the extruder is a twin screw extruder, having multiple metered feeds. The filler which may comprise fiber and/or particulate fillers is fed to the extruder using a separate metered feed. All the remaining ingredients, including heat and light stabilizers, coupling agents, mold release agents, and the like are throughly mixed in a suitable mixer such as a tumble blender. The resulting mixture is then metered to the extruder using a separate metered feed. The extruder is preferably a twin screw extruder operating at from 100 to 450, preferably about 250–350 rpm and at a melt temperature from 250°–340° C. The composition is extruded as a strand which is cooled, generally in a water bath, then cut into pellets of appropriate length. The pellet may then be dried and used in injection molding.

It should be noted that it is also possible to subsequently add fillers such as fibers or particulates to the compositions of the invention which do not contain fiber. The preformed pellets could be fed to the hopper of an extruder and the filler could be metered in separately.

The present invention will be illustrated by the following examples in which parts are parts by dry weight (e.g. lb.) unless otherwise stated.

EXAMPLE I

Two compounds were prepared to have the following compositions:

| Component | Compound I | Compound II |
|---|---|---|
| Succinic Anhydride | 0.8 | 0.8 |
| Glass fiber | 30 | 30 |
| High density polyethylene | 1 | 3 |
| Polycarbonate | 27 | 0 |
| Poly (ethylene terephthalte) resins | | |
| Recycle: 29. | 46.2 | |
| Virgin: 12.2 | 20.0 | |
| | 100.0 | 100.0 |

The polyethylene terephthalate and when present polycarbonate were mixed using a ribbon blender. The resulting mixture was dried for 4 fours at 260° F. and fed to a twin screw extruder. The anhydride and polyethyene were metered into the twin screw extruder. The glass was metered though a seperate feed to the extruder. The extrudate was passed through a cooling water tank and air dried. The extrudate was then cut into pellets ⅛" long. The extruder was operated using a vacuum vent at 25 inches (63.5 mm) of Hg. The head pressure in the extruder was from 110 to 120 psi. The resulting pellets were dry free flowing having structural integrity and no pores.

EXAMPLE II

The pellets of formula I prepared in Example I were compounded with antioxidant and mold release agents and injection molded to make small (hand sized) parts. The control formula was the same except the resin was Rynite 530FR a 30 percent glass filled flame retardant polyethylene terephthalate. Parts prepared from the compounds of formula I had satisfactory smoothness, well defined detail and edges, and essentially no shrinkage. The parts met the qualtiy control requirements of the manufacturer.

The experimental product gave a 13 percent faster cycle time at about 20° C. lower mold and barrel temperature. This improvement in productivity is attributed to faster crystalization due to the anhydride.

EXAMPLE III

The pellets made from formula II in Example I were used to make the part as in Example II. The resulting part was as well formed as that in Example II. The composition processed best at 40° C. lower mold and barrel temperature then the control.

EXAMPLE IV

The pellets made from formula II in example I were used to make the parts as in example II. The resulting parts were as well formed as those of Example II. The pellets of formula II in example I were dried for only 3 hours at 250° F. compared to the normally required minimum of 4, and usually 6 hours at 250° F. for PET resins. This demonstrates the lower sensitivity to water during processing of PET resin treated in accordance with the present invention.

EXAMPLE V

Parts prepared from the material in examples II and III and a control part were tested for stress/strain properties. The results are set forth in Table II.

TABLE II

| Test | Control | Compound 1 | Compound II |
|---|---|---|---|
| Tensile Strength(PS1) (ASTM D-638) | 16900 | 19500 | 18700 |
| Elongation % (ASTM D-638) | 1.9 | 1.9–2 | 1.8–1.9 |
| Modulus M PSI (ASTM D-790) | 1.2 | 1.5 | 1.6 |
| IZOD impact FT.-lb./in. (ASTM D-256) | 1.8 | 1.7–2.0 | 2.0 |

The balance of properties in products prepared for compositions in accordance with the present invention is acceptable.

Example VI

The compounds I and II of Example I were modified by incorporating 1% antioxidant (designed as Ia and IIa) or using a nucleating system comprising 0.8 weight percent succinic anhydride and 0.8 weight percent talc (designated as Ib and IIb). The compounds were extruded as a ⅛ inch sheet under comparable conditions as outlined in examples II and III. Samples of extruded sheet (⅛ inch) of the controls (Compound I, II) and the compounds containing antioxidant (Ia, IIa) and the compounds containing talc (Ib and IIb) were tested for tensile strength, elongation, modulus, and IZOD impact. The results, and ASTM test procedures are set forth in table III.

TABLE III

| Compound | I | II | Ia | IIa | Ib | IIb |
|---|---|---|---|---|---|---|
| Tensile Strength (PSI) (ASTM D-638) | 19100 | 18200 | 20200 | 18800 | 20000 | 19000 |
| Elongation % (ASTM D-638) | 1.9–2.0 | 2.0 | 2.1 | 2.0 | 1.9 | 1.9 |
| Modulus MPSI (ASTM D-790) | 1.5 | 1.7 | 1.6 | 1.4 | 1.6 | 1.6 |
| IZOD Impact Ft. lb./in. (ASTM D-256) | 2.1 | 2.0 | 2.2 | 2.2 | 1.8 | 1.5 |

What is claimed is:

1. A composition consisting essentially of:
   (A) at least 0.2 weight percent of a nucleating system comprising at least 50 weight percent of succinic anhydride and up to 50 weight percent of one or more nucleating agents selected from the group consisting of:
      (i) talc and sodium bicarbonate;
      (ii) alkali metal salts of carboxylic acids;
      (iii) ionomers; and;
      (iv) crystalization promoters;
   (B) from 35 to 99 weight percent of a mixture comprising:
      (i) at least 50 weight percent of one or more high molecular weight crystalizable polyesters; and
      (ii) up to 50 weight percent of one or more alloy modifiers;
   (C) optionally up to 60 weight percent of one or more fillers selected from the group consisting of:
      (i) fibers having of length up to ¾ inch selected from the group consisting of glass, other inorganic fibers, carbon fiber and aramid fibers, provided that if glass fiber is present up to 50 weight percent of the glass fiber may be replaced by a low warpage mineral additive; and
      (ii) particulate inorganic fillers.
   (D) optionally up to 35 weight percent of one or more rubbery impact modifiers;
   (E) from 0.5 to 5 weight percent of high density polyethylene;
   (F) optionally up to a total of about 20 weight percent of one or more additives selected from the group consisting of antioxidants, flame retardants, heat and light stabilizers, coupling agents and mold release agents; and
   (G) optionally a pigment.

2. A composition according to claim 1 wherein said nucleating system is present in an amount from 0.5 to 10 weight percent.

3. A composition according to claim 2 wherein said mixture is present in an amount from 60 to 80 weight percent and said one or more high molecular weight crystalizable polyesters is selected from the group consisting of poly (ethylene terephthalate), poly (butylene terephthalate) and a mixture thereof.

4. A composition according to claim 3 where said alloy modifier is present in said mixture in an amount from 5 to 45 weight percent and comprises a polycarbonate of bisphenol A.

5. A composition according to claim 3 wherein said filler is present in an amount from 20 to 45 weight percent and comprises fiber up to ¾ inch in length.

6. A composition according to claim 4 wherein said filler is present in an amount from 20 to 45 weight % and comprises fiber up to ¾ inch in length.

7. A composition according to claim 5 wherein said fiber is glass and up to 50 weight % of said glass fiber is replaced by mica.

8. A composition according to claim 6 wherein said fiber is glass and up to 50 weight % of said glass fiber is replaced by mica.

9. A composition according to claim 3 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:
  (i) $C_{3-8}$ ethylenically unsaturated carboxylic acids;
  (ii) anhydrides of $C_{3-8}$ ethylenically unsaturated carboxylic acids;
  (iii) $C_{1-8}$ alkyl and hydroxyalkyl esters of $C_{3-8}$ ethylenically unsaturated carboxylic acids;
  (iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;
  (v) $C_{3-8}$ alkenyl and hydroxyalkenyl esters of $C_{1-8}$ saturated carboxylic acids; and
  (vi) $C_{3-8}$ ethylenically unsaturated aldehydes.

10. A composition according to claim 4 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:
  (i) $C_{3-8}$ ethylenically unsaturated carboxylic acids;
  (ii) anhydrides of $C_{3-8}$ ethylenically unsaturated carboxylic acids;
  (iii) $C_{1-8}$ alkyl and hydroxyalkyl esters of $C_{3-8}$ ethylenically unsaturated carboxylic acids;
  (iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;
  (v) $C_{3-8}$ alkenyl and hydroxyalkenyl esters of $C_{1-8}$ saturated carboxylic acids; and
  (vi) $C_{3-8}$ ethylenically unsaturated aldehydes.

11. A composition according to claim 5 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:
  (i) $C_{3-8}$ ethylenically unsaturated carboxylic acids;
  (ii) anhydrides of $C_{3-8}$ ethylenically unsaturated carboxylic acids;
  (iii) $C_{1-8}$ alkyl and hydroxyalkyl esters of $C_{3-8}$ ethylenically unsaturated carboxylic acids;
  (iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;
  (v) $C_{3-8}$ alkenyl and hydroxyalkenyl esters of $C_{1-8}$ saturated carboxylic acids; and
  (vi) $C_{3-8}$ ethylenically unsaturated aldehydes.

12. A composition according to claim 6 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:
  (i) $C_{3-8}$ ethylenically unsaturated carboxylic acids;
  (ii) anhydrides of $C_{3-8}$ ethylenically unsaturated carboxylic acids;
  (iii) $C_{1-8}$ alkyl and hydroxyalkyl esters of $C_{3-8}$ ethylenically unsaturated carboxylic acids;
  (iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;
  (v) $C_{3-8}$ alkenyl and hydroxyalkenyl esters of $C_{1-8}$ saturated carboxylic acids; and
  (vi) $C_{3-8}$ ethylenically unsaturated aldehydes.

13. A composition according to claim 7 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:
  (i) $C_{3-8}$ ethylenically unsaturated carboxylic acids;
  (ii) anhydrides of $C_{3-8}$ ethylenically unsaturated carboxylic acids;
  (iii) $C_{1-8}$ alkyl and hydroxyalkyl esters of $C_{3-8}$ ethylenically unsaturated carboxylic acids;
  (iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;

(v) $C_{3-8}$ alkenyl and hydroxyalkenyl esters of $C_{1-8}$ saturated carboxylic acids; and (vi) $C_{3-8}$ ethylenically unsaturated aldehydes.

14. A composition according to claim 8 wherein said impact modifier is present in an amount from 10 to 30 weight % and is selected from the group consisting of EP rubber, EPDM rubber, styrene-butadiene-styrene block polymers, hydrogenated stryene-butadiene-styrene block copolymer, acrylate rubber, core/shell acrylates, and co or homopolymers of one or more $C_{4-6}$ conjugated diolefins which are unsubstituted or substituted by a chlorine atom, which impact modifiers optionally further comprise up to 15 weight percent of one or more functional monomers selected from the group consisting of:

(i) $C_{3-8}$ ethylenically unsaturated carboxylic acids;

(ii) anhydrides of $C_{3-8}$ ethylenically unsaturated carboxylic acids;

(iii) $C_{1-8}$ alkyl and hydroxyalkyl esters of $C_{3-8}$ ethylenically unsaturated carboxylic acids;

(iv) amides of $C_{3-8}$ ethylenically unsaturated carboxylic acids, which amides are unsubstituted or substituted at the nitrogen atom by up to two radicals selected from the group consisting of $C_{1-4}$ alkyl and hydroxyalkyl radicals;

(v) $C_{3-8}$ alkenyl and hydroxyalkenyl esters of $C_{1-8}$ saturated carboxylic acids; and (vi) $C_{3-8}$ ethylenically unsaturated aldehydes.

* * * * *